United States Patent [19]

Ammann et al.

[11] Patent Number: 5,642,495

[45] Date of Patent: Jun. 24, 1997

[54] MULTI-PROCESSOR COMPUTER SYSTEM HAVING ASSIGNMENT TABLE PROCESSOR-DEPENDENT HELP TABLE AND ADDRESS-DEPENDENT HELP TABLE FOR EFFICIENTLY MANAGING PRIVATE AND COMMON STORAGE AREAS

[75] Inventors: Eckhard Michael Ammann, Reutlingen; Hans Helmut Diel, Sindelfingen, both of Germany

[73] Assignee: International Business Machines Corporation, Armonk, N.Y.

[21] Appl. No.: 256,424

[22] PCT Filed: Oct. 29, 1993

[86] PCT No.: PCT/EP93/03022

§ 371 Date: Dec. 20, 1995

§ 102(e) Date: Dec. 20, 1995

[87] PCT Pub. No.: WO94/11824

PCT Pub. Date: May 26, 1994

[51] Int. Cl.[6] ............................................. G06F 13/00
[52] U.S. Cl. ........................ 395/480; 395/474; 395/823; 395/421.11
[58] Field of Search ........................... 364/134; 395/417, 395/416, 412, 415, 480, 474, 421.11, 823

[56] References Cited

U.S. PATENT DOCUMENTS

| | | | |
|---|---|---|---|
| 5,117,350 | 5/1992 | Parrish et al. | 395/425 |
| 5,220,669 | 6/1993 | Baum et al. | 395/725 |
| 5,293,602 | 3/1994 | Fukagawa et al. | 395/425 |
| 5,303,362 | 4/1994 | Butts, Jr. et al. | 395/425 |

*Primary Examiner*—Thomas C. Lee
*Assistant Examiner*—Le Hien Luu
*Attorney, Agent, or Firm*—Thornton & Thornton

[57] ABSTRACT

A multi-processor computer system is described that consists of at least two processors equipped with storage means. Each of the processors is assigned at least one private storage area (10) in the storage means. Furthermore, at least one common storage area (16) is provided in the storage means, to which a portion (13) of the private storage area (10) is assigned. Through this storage means arrangement, it is possible, using appropriate commands, to transfer messages between different processors via common storage areas. The management of the private and common storage areas is accomplished using tables, whereby the use of help tables simplifies locating information required for carrying out specific commands.

7 Claims, 2 Drawing Sheets

MULTI-PROCESSOR COMPUTER SYSTEM HAVING ASSIGNMENT TABLE PROCESSOR-DEPENDENT HELP TABLE AND ADDRESS-DEPENDENT HELP TABLE FOR EFFICIENTLY MANAGING PRIVATE AND COMMON STORAGE AREAS

FIELD OF THE INVENTION

The invention relates to a computer system with at least two processors equipped with storage means, whereby each of the processors is assigned at least one private storage area in the storage means. The invention further relates to a method employed in such a computer system for assigning a portion of a private storage area to a common storage area.

BACKGROUND OF THE INVENTION

Multi-processor computer systems of the stated type have been disclosed. Likewise, various possible approaches have been disclosed for managing storage means by multi-processor computer systems. The type of such management is usually dependent on the specific application. If the storage means, for example, are to be used to transfer messages between the individual processors of the multi-processor computer system, management of the storage means in this case differs from the case in which a common storage area assigned to multiple processors is locked and unlocked to ensure defined access sequences. The management of the storage means by multi-processor computer systems is therefore application-related and thus inflexible.

SUMMARY OF THE INVENTION

The object of the invention is to create a multi-processor computer system, and a corresponding method, which allows management of the storage means adaptable in a simple manner to different applications and requirements.

This objective is substantially fulfilled by the invention in that, for a computer system as originally described, at least one common storage area is provided in the storage means, to which a portion of at least one of the private storage areas is assigned. In a method as originally described, the objective is substantially fulfilled in that, depending on the common storage area, a pointer is read from a table of the common storage areas which references a table of the assigned portions of the private storage areas and that, depending on the pointer, the portion of the private storage area assigned to the common storage area is read from the table of the assigned portions of the private storage areas.

The common storage area can be laid out depending on the specific application. Also, the number of assigned private storage areas, as well as the layout of these private storage areas, is flexible. The invention thus enables flexible management of the storage means of a multi-processor computer system.

In particular, this is accomplished using the table of the common storage areas and the table of the assigned portions of the private storage areas. The table of the common storage areas contains, for each common storage area, a pointer to the table of the assigned portions of the private storage areas. Using this pointer, the latter table furnishes that portion of the private storage area that is assigned to the common storage area. Using both tables, any assignment of private and common storage areas can be managed in simple fashion.

In an advantageous embodiment of the invention, a processor-dependent help table and an address-dependent help table are provided. Using these two help tables, faster access to assigned portions of the private storage areas is possible.

In a further embodiment of the invention, commands are provided for defining and associating the common storage areas and the portions of the private storage areas. Commands are also provided for exchanging any form of information between the common and private storage areas.

Further advantages and forms of the invention can be understood from the following description of one embodiment represented by the drawings.

DESCRIPTION OF THE PREFERRED EMBODIMENTS

A multi-processor computer system comprises at least two and normally several processors. Each processor is usually provided with some type of storage media, for example, semiconductor memory or disk storage. These storage media can on the one hand be assigned to the specific processor; however, it is also possible for all storage media as a whole to form the storage means of the entire multi-processor computer system.

Figure 1:
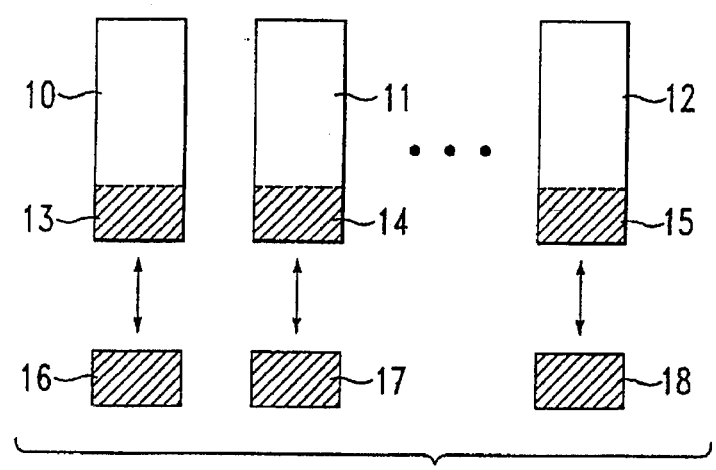
FIGS. 1 to 3 show possible assignments of common storage areas of a multi-processor computer system to portions of private storage areas of individual processors.
Figure 2:
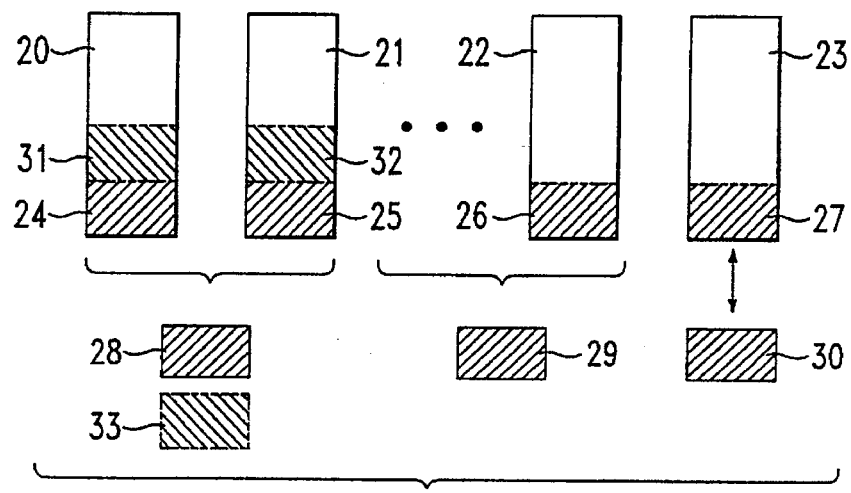
Figure 3:
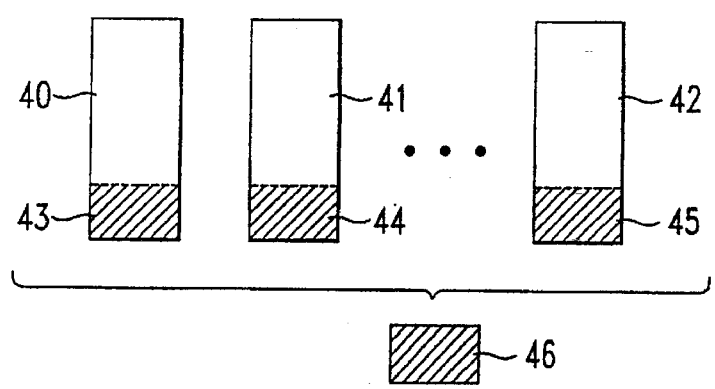

In FIGS. 1 to 3, possible assignments of these storage means of a multi-processor computer system to the individual processors are shown. Here, the distinction is always made between private storage areas and common storage areas. A private storage area is one to which only one specific processor has access. This does not mean, however, that this private storage area of one processor is identical to the storage media assigned to the processor; this may be true, but it is not necessarily so. A common storage area is one to which several or even all processors of the multi-processor computer system have access rights. Such a common storage area can reside in the storage media of a specific, selected processor; it is, however, also possible that such a common storage area is assigned to one or even several processors of the multi-processor computer system.

In FIG. 1, a plurality of private storage areas 10, 11, 12 are shown. Also depicted are an equal number of common storage areas 16, 17, 18. The private storage area 10 and the common storage area 16 are associated with each other, the private storage area 11 and the common storage area 17 are associated with each other, etc.

In each of the private storage areas 10, 11, 12, portions 13, 14, 15 are present which are assigned to the common storage areas 16, 17, 18, respectively. This assignment signifies that, for example, the contents of portion 13 of the private storage area 10 is identical to that of the associated common storage area 16, disregarding time delays associated with storing. The processor which has the access rights to the private storage area 10 and thus to portion 13 of the private storage area 10, can read and/or modify data in this portion 13. The processor can then copy portion 13 to the common storage area 16. At a later time, the common storage area 16 can be moved back to portion 13 of the private storage area 10 for further processing.

Since in FIG. 1 only a single portion of the private storage areas is assigned to each common storage area, in the case of FIG. 1 no functions such as the transfer of messages between the individual processors can be carried out using these common storage areas 16, 17, 18.

In contrast, FIG. 2 shows a number of private storage areas 20, 21, 22, 23, whereby a respective portion 24, 25, 26, 27 of these private storage areas 20, 21, 22, 23 is indicated separately. Unlike FIG. 1, FIG. 2 provides several common storage areas 28, 29, 30, which are assigned not to a respective single private storage area but rather to possibly several private storage areas.

In this manner, the common storage area 28 is assigned to portion 24 of the private storage area 20 as well as to portion 25 of the private storage area 21. Likewise, the common storage area 29 is assigned to portion 26 of the private storage area 22 as well as other portions of private storage areas. Only the common storage area 30 is assigned to one private storage area, namely portion 27 of the private storage area 23.

The processor associated with the private storage area 20 can access, and possibly modify, portion 24 of the private storage area 20. Then, portion 24 of the private storage area 20 can be copied to the common storage area 28. From there, the processor associated with private storage area 21 can in turn copy the common storage area 28 to its assigned portion 25 of the private storage area 21. The processor can now process and modify the data in portion 25 of the private storage area 21. Portion 25 may then be copied to the common storage area 28 and later rewritten to portion 24. In this way the processor associated with private storage area 20 and the processor associated with private storage area 21 can exchange data via the common storage area 28.

This data can comprise messages to be transferred between the processors. Likewise, the common storage area 28 can be used to lockout these processors from one another. This possibility will be discussed later in detail.

Furthermore, in FIG. 2 the private storage areas 20, 21 contain additionally the portions 31, 32, which are assigned to a further common storage area 33. This embodiment will also be explained later in more detail.

In FIG. 3, a number of private storage areas 40, 41, 42 are shown with respective portions 43, 44, 45, to which a single common storage area 46 is assigned. In this embodiment, the processor associated with private storage area 40 can write data to portion 43. This data is transferred to the common storage area 46, such that now the data can be read by the processors associated with private storage areas 41, 42 into the respective portions 44, 45 of these private storage areas 41, 42. From there, the data can in turn be processed and modified by the respective processors and then written back to the common storage area 46.

In FIG. 3, the common storage area 46 can be used to transfer messages between the processors associated with private storage areas 40, 41, 42. The common storage area 46 can also be used for locking, that is, ensuring an orderly access sequence to the data.

Regardless of whether the storage means of the multiprocessor computer system are apportioned as shown in FIGS. 1, 2, or 3, management of the storage means is always accomplished using the same commands, described below.

If a common storage area does not yet exist, such a common storage areas can be defined via the command "DEFINE GSB (GSBID)". The letters GSB indicate that the definition applies to a common storage area. The letters GSBID represent an abbreviation for the name of the newly created common storage area, that is, an identification of the new common storage area.

Following this command, the newly established common storage area can be further defined with the command "ALLOCATE GSB (GSBID, GSBAA, PSBID, PSBAA, SBL)" and in particular assigned to a portion of a private storage area. As already mentioned, GSBID is the identification of the common storage area. GSBAA is an abbreviation for the starting address of this common storage area. Likewise, PSBID is the identification of the assigned portion of the private storage area, while PSBAA is an abbreviation for the starting address of this assigned portion of the private storage area. Finally, SBL is an abbreviation for the length of the common storage area and the assigned portion of the private storage area.

Using both of these commands, it is possible to define a common storage area and assign it to a specific portion of a private storage area. Furthermore, both commands can be used to define the starting addresses and lengths of the common storage area and the assigned portion of the private storage area.

Referring for example to FIG. 1, the two commands can be used to define storage areas 16, 17, 18 and the respective associated portions 13, 14, 15 of the private storage areas 10, 11, 12.

By corresponding repetition of the "ALLOCATE . . . " command, it is also possible to assign multiple portions of private storage areas to a single common storage area. In the consecutive ALLOCATE commands, only the PSBID for the respective portion of the corresponding private storage areas changes. In addition, the PSBAA starting addresses of the respective portions of the private storage areas can differ from one another. The length SBL of the storage areas, however, is identical for all assigned portions. Using such a repeated "ALLOCATE . . . " command, it is therefore possible to assign a common storage area as shown in FIG. 2 to two or more portions of private storage areas or to assign a common storage area as shown in FIG. 3 to all portions of the private storage areas.

The counterpart of the "ALLOCATE . . . " command is the command "DEALLOCATE GSB (GSBID, GSBAA, SBL)". This command can be used to cancel the assignment of a common storage area to portions of private storage areas and to delete the common storage area as such. After executing the "DEALLOCATE . . . " command, therefore, the common storage area with the identification GSBID no longer exists. This former common storage area can no longer be accessed after the "DEALLOCATE . . . " command.

If at least one common storage area has been established, and associated with at least one private storage area, the commands "COPY FROM PSB TO GSB (GSBID, PSBAA, SBL)" and "COPY FROM GSB TO PSB (GSBID, PSBAA, SBL)" can be used to copy data between the common storage area and the assigned portion of the private storage area. Due to the GSBID, the common storage area which is to participate in the data exchange is known. Using the starting address PSBAA of the assigned portion of the private storage area, the portion of the private storage area which is to participate in the data exchange is known. The specification of the length of the storage area SBL defines the amount of data to be exchanged. All in all, the COPY command specifications can be used to carry out the data exchange.

Referring to FIGS. 1 to 3, the COPY commands can, for example, copy the common storage area 29 of FIG. 2 to portion 26 of the common storage area 22, or portion 44 of the private storage area 41 of FIG. 3 to the common storage area 46.

Similarly to the two copy commands, it is possible to introduce so-called page-in and page-out commands. Like the copy commands, such commands can copy data from the common storage area to the associated portion of the private storage area and vice-versa. The amount of data can however be limited to a specific value, for example to the value employed in general storage means management in so-called "paging". In this case, the specification SBL of the length of the common storage area and the associated portion of the private storage area can be omitted in the page-in or page-out commands.

If a common storage area is established and assigned to at least two portions of private storage areas, it is possible using the common storage area to exchange messages between the associated processors. For this purpose, the commands "SEND GSB ( . . . )" and "RECEIVE GSB ( . . . )" are provided. The data to be sent is written from the assigned portion of the private storage area for the sending processor into the common storage area. The receiving processor can then transfer this data using the RECEIVE command to its assigned portion of its private storage area.

By assigning the common storage area to only two portions of private storage areas and thereby to only two associated processors, it is uniquely established between which two processors the data transfer is to occur. If, for example, the sending processor wants to transfer data to another processor with which it up to now does not share a common storage area, it is first necessary, prior to the SEND command, to define a common storage area for these two processors. Only then can the data be transferred via the new common storage area.

In this way too, so-called broadcasts can be carried out. For this purpose, a common storage area must be established to which all processors have access, as shown in the example of FIG. 3. If one of the processors now wants to transfer data to all other processors, it writes the data to the common storage area using the SEND command. From there, all other processors can retrieve the data using the RECEIVE command.

In the broadcast situation just mentioned, in order that the receiving processors are notified at all that another processor has sent data, all processors must periodically monitor the mentioned common storage area for data changes. This checking can be done by each processor completely independently of all other processors, so that the described broadcast transfer does not require synchronization of all processors.

If two common storage areas are, for example, assigned to two private storage areas, as in the case of FIG. 2 with the two common storage areas 28, 33 and the assigned portions 24, 25, 31, 32 of the two private storage areas 20, 21, one common storage area can be used to lock and unlock the second common storage area. For this purpose, the commands "LOCK GSB ( . . . )" and "UNLOCK GSB ( . . . )" are provided.

If, for example, in FIG. 2 the processor associated with the private storage area 20 wants to ensure that the processor associated with the private storage area 21 cannot read some type of data in the common storage area 28, the processor associated with private storage area 20 uses the LOCK command to define a so-called LOCK variable in the common storage area 33. The processor associated with private storage area 21 checks this LOCK variable in the common storage area 33 and determines that access to the common storage area 28 is at least temporarily denied. After the processor associated with private storage area 20 has, for example, modified some data in portion 24 of the private storage area 20 and then copied this portion 24 to the common storage area 28, the processor associated with private storage area 20 may again want to permit access to the common storage area 28 by the processor associated with the private storage area 21. For this purpose, the processor associated with the private storage area 20 resets the LOCK variable in the common storage area 33 using the UNLOCK command. The processor associated with the private storage area 21 can determine this with an appropriate check. Since the common storage area 28 is now no longer locked for the processor associated with private storage area 21, the latter can copy the common storage area 28 into portion 25 of its private storage area 21 and process it.

The setting and resetting of the LOCK variables via the LOCK and UNLOCK commands is accomplished using the common storage area 33 and the two assigned portions 31, 32 of the private storage areas 20, 21. In a simple application of the LOCK or UNLOCK command, the LOCK variable is first set into portion 31 by the processor associated with private storage area 20, and this portion 31 is subsequently copied to the common storage area 33. The checking of the common storage area 33 occurs in similar fashion. Here, it is sufficient that the common storage area 33 is copied for example to the private storage area 21 and then checked by the processor associated with private storage area 21.

In the previously described commands, it is necessary to locate the assigned portions of the private storage areas based on the GSBID. However, the information contained in the commands for this purpose, such as the PSBID of the portion of the private storage area or the starting address PSBAA of this portion of the private storage area, does not represent absolute addresses but rather only indirect references to such absolute addresses. It is therefore necessary to further process the information contained in the commands to determine therefrom the absolute starting address of the associated portion of the private storage area. This is now discussed in more detail with reference to FIG. 4.

Figure 4:
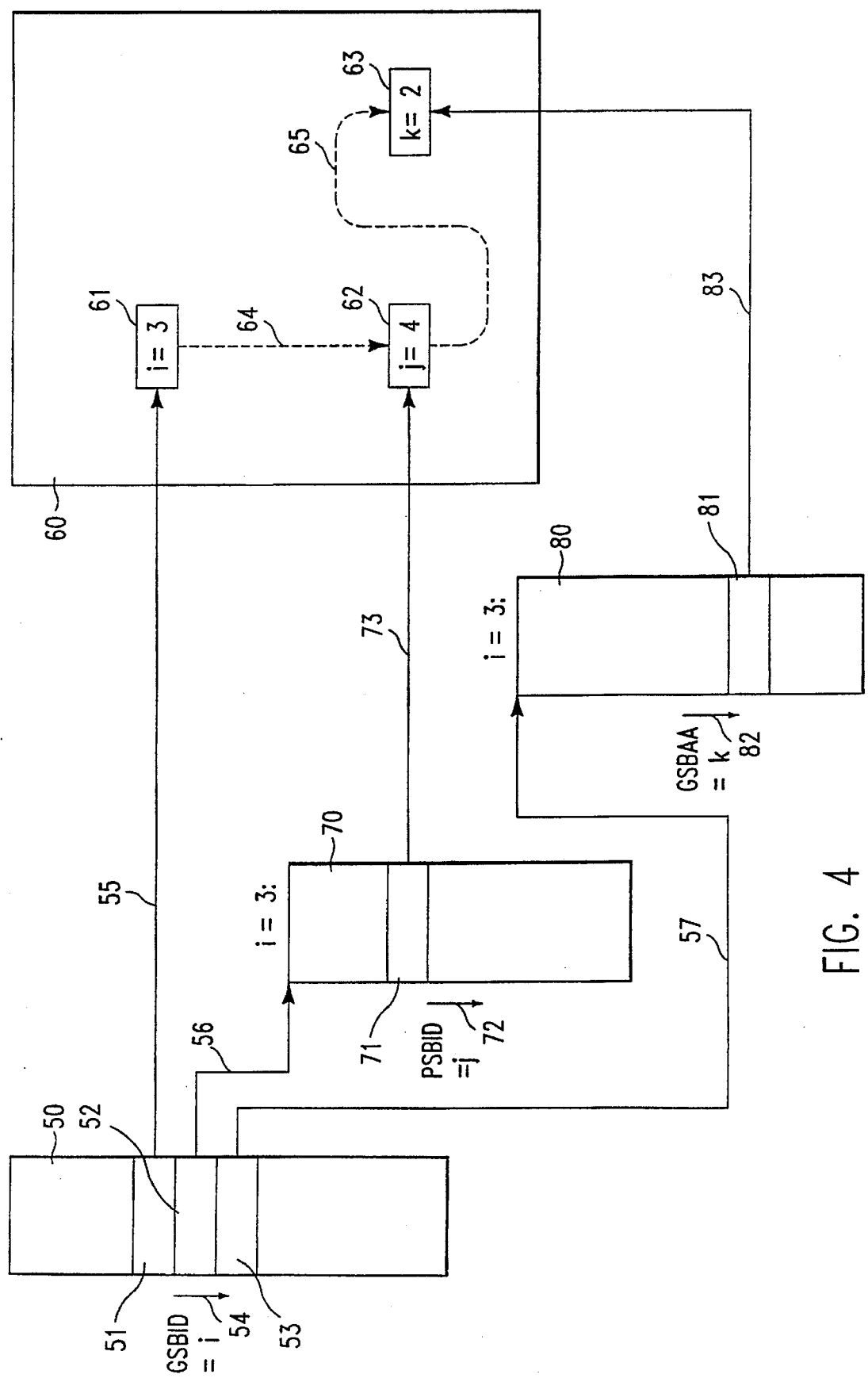
FIG. 4 is a schematic representation of the tables for associating the common storage areas and the portions of the private storage areas.

In FIG. 4, a table 50 is shown in which the common storage areas reside. In addition, a table 60 is shown in which the assigned portions of the private storage areas reside. Finally, FIG. 4 also shows a processor-dependent help table 70 as well as an address-dependent help table 80.

In table 50 of the common storage areas, for each common storage area there is a pointer 51 to the table 60 of assigned portions of the private storage areas, a pointer 52 to the processor-dependent help table 70, and a pointer 53 to the address-dependent help table 80. The individual common storage areas in table 50 are stored in the order of their GSBIDs. This is indicated in FIG. 4 by an arrow 54, whereby the GSBID order is denoted by the letter i.

If, for example, the third common storage area applies, that is i=3, the pointer 51 in table 50 for this third common storage area points to a data field 61 in table 60 of the assigned portions of the private storage areas. This is indicated in FIG. 4 by an arrow 55. Not all information for the portions of private storage areas assigned to the third common storage area is present in the data field 61, however. Instead, only that information is contained in storage field 61, for example, which is associated with a first assigned portion of a private storage area. The information associated with a second and a third assigned portion of a private storage area is stored in data fields 62 and 63. Access to these data fields 62, 63 is enabled, for example, by the pointer in data field 61 to data field 62, the pointer in data field 62 to data field 63, etc. To locate a certain assigned portion of a private storage area, a chain 64, 65 of several data fields may have to be searched.

To permit more rapid access to a certain portion of a private storage area, and to avoid searching the mentioned chain 64, 65 of data fields, the processor-dependent and address-dependent help tables 70, 80 are provided. For each common storage area, there is a process-dependent table and an address-dependent table. The number of processor-dependent help tables 70 and address-dependent tables 80 therefore corresponds to the number of common storage areas stored in table 50.

In FIG. 4, the processor-dependent help table 70 and the address-dependent help table 80 are shown for the third common storage area, that is for i=3. These specific help tables 70, 80 can be accessed via the pointers 52, 53 in table 50 of the common storage areas. This is indicated in FIG. 4 by the arrows 56, 57.

The processor-dependent help table 70 contains pointers 71 to table 60 of the assigned portions of private storage areas. These pointers are stored in table 70 in processor order. The order of the processors therefore has the same significance as the order of the PSBIDs of the assigned portions of the private storage areas. This is indicated in FIG. 4 by an arrow 72 and the letter j.

If, for example, multiple portions of private storage areas are assigned to a common storage area, and if, for example, the fourth portion of a private storage area is applicable to the relevant command, pointer 71 in the processor-dependent table 70 points directly to the data field 62, which contains the information for the fourth assigned portion of a private storage area. It is therefore no longer necessary to first read data field 61 and then reach data field 62 stepwise via the chain 64; rather, pointer 71 permits direct access to data field 62. This direct access is indicated in FIG. 4 by an arrow 73.

Even if data field 62 can be accessed directly via processor-dependent table 70 to locate a certain portion of a private storage area, that is, without searching chain 64, it is possible that the correct portion of the private storage area has still not been found. As previously discussed, this is possible when multiple private storage areas are assigned to a common storage area. In this case, as previously discussed, the desired data field 63 must be located from data field 62 via the chain 65. To avoid this searching of chain 65, the address-dependent help table 80 is provided.

The help table 80 contains pointers 81 which point to certain data fields in table 60 of the assigned portions of the private storage areas. These pointers 81 are contained in the address-dependent help table 80 in the order of the starting addresses GSBAA of the common storage areas. This is indicated in FIG. 4 by an arrow 82 and the letter k.

Using the pointer 81, it is therefore possible, as also shown in FIG. 4 with an arrow 83, to access the desired data field 63 directly. A search of the chains 64, 65 is thus not required.

To what extent the processor-dependent table 70 and the address-dependent table 80 can be used depends on the individual commands. For example, the copy commands discussed contain no information with respect to the PSBID of the assigned portions of the private storage areas. For this reason, no entry can be present in the processor-dependent table 70. Also, in the table 50 of the common storage areas there is no entry for the pointer 52. In contrast, the described ALLOCATE command contains all data needed for respective entries in both help tables. In this case, therefore, the two help tables 70, 80 can be used directly to locate the associated portions of the private storage area. All commands, however, contain the GSBID. Thus, with all commands, it is possible via the chains 64, 65 to locate the relevant data fields in the table 60 of the assigned portions of private storage areas.

Table 50 of the common storage areas, table 60 of the assigned portions of the private storage areas, and all processor-dependent help tables 70 and address-dependent help tables 80 are stored in each of the private storage areas of the processor of the multi-processor computer system. If one of the commands mentioned is presented to one of these processors for processing, the processor uses the aforementioned tables and help tables to locate the information needed to process the command. In particular, the processor uses table 60 of the assigned portions of the private storage areas to determine the absolute addresses of these common storage areas and of the assigned portions of the private storage areas. Subsequently, the processor executes the command, copying, for example, a specified portion of a private storage area to a specified common storage area.

If a command results in modification of data in the mentioned tables and help tables, as is the case with the ALLOCATE command, for example, the processor carries out this modification not only in its own private storage area but also in all other tables and help tables of the remaining private storage areas. These modifications of the tables and help tables must take place in the form of so-called transactions, so that at any time all tables and help tables in all private storage areas agree.

The entire foregoing description relates to a multi-processor computer system. It is, however, also possible for the invention described to be used in a single-processor computer system. In this case, the storage means associated with the single processor can be distributed as indicated in FIGS. 1 to 3. Here, the different private storage areas represent "multiple processors", whereby these "multiple processors" are identical.

We claim:

1. A computer system comprising;
 a plurality of processors; each of said processors being equipped with a respective storage means;
 each of the processors having in its respective storage means a private storage area, partitioned into first, second, and third portions; and
 a plurality of common storage areas, each of said common storage areas being assigned to the second and third portions of the private storage areas in at least two of said processors;
 a common storage area table coupled to the processors;
 an assignment table, of the assigned portions of the private storage areas coupled to the common storage table;
 said common storage area table including a first pointer for locating, in the assignment table, the assigned portions of the private storage areas stored in the common storage area table;
 a processor-dependent help table; and
 an address-dependent help table;
 both the processor-dependent help table and the address dependent help table being coupled between and to the assignment table and the common storage means.

2. A computer system comprising;
 at least two processors, each equipped with a respective storage means; each of the processors having a private storage area divided into first and second portions;

a common storage area, to which either or both processors may have access, residing in the storage means of at least one of said processors and being assigned to a first portion of at least one of the private storage areas in one of said processors;

a common storage area table coupled to the processors;

an assignment table, of the assigned portions of the private storage areas coupled to the common storage table;

said common storage area table including a first pointer for locating, in the assignment table, the assigned portions of the private storage areas stored in the common storage area table;

a processor-dependent help table; and an address-dependent help table;

both the processor-dependent help table and the address dependent help table being coupled between and to the assignment table and the common storage means.

3. Computer system in accordance with claim 2, characterized in that in the table (50) of the common storage areas, for each of the common storage areas, a pointer (52) to the associated processor-dependent help table (70) and a pointer (53) to the associated address-dependent help table (80) are stored.

4. Computer system in accordance with claim 3, characterized in that in the processor-dependent help table (70), for each of the processors, a pointer (71) to the table (60) of the assigned portions of the private storage areas is stored.

5. Computer system in accordance with claim 4, characterized in that in the address-dependent help table (80), for each of the starting addresses of the assigned portions of the private storage areas, a pointer (81) to the table (60) of the assigned portions of the private storage areas is stored.

6. A method for assigning a first portion of a private storage area to a common storage area in a computer system consisting of at least two processors, each being equipped with a respective storage means comprising the steps of:

reading, from a table of the common storage area, a first pointer to an assignment table; and reading, from the assignment table, the private storage area portion assigned to the common storage area indicated by the first pointer;

reading, from the table of the common storage areas, a second pointer to a processor-dependent help table;

reading, from the portion of the processor-dependent help table indicated by said second pointer, a third pointer to the assignment table; and reading, from the assignment table, the portion of the private storage area assigned to the common storage area indicated by said third pointer.

7. Method in accordance with claim 6, with the following steps:

depending on the common storage area, a pointer (53) to an address-dependent help table (80) is read from the table (50) of the common storage areas, depending on the applicable starting address, a pointer (81) to the table (60) of the assigned portions of the private storage areas is read from the address-dependent help table (80), depending on the pointer (81), the private storage area (10) portion (13) assigned to the common storage area (16) is read from the table (60) of the assigned portions of the private storage areas.

* * * * *